United States Patent [19]

Creasy

[11] Patent Number: 5,262,475
[45] Date of Patent: Nov. 16, 1993

[54] HYDROPHILIC COMPOSITIONS WHICH ARE FOG-RESISTANT

[75] Inventor: Walter S. Creasy, Bridgewater, N.J.

[73] Assignee: Film Specialties, Inc., Whitehouse, N.J.

[21] Appl. No.: 882,458

[22] Filed: May 12, 1992

[51] Int. Cl.$^5$ .............. C08L 39/04; C08L 61/28; C08L 29/04
[52] U.S. Cl. ........................ 525/58; 525/56; 525/57; 525/203; 525/518; 427/163; 427/164; 427/165; 428/46
[58] Field of Search ............ 525/58, 56, 57, 518, 525/203; 427/163, 164, 165; 428/46

[56] References Cited

U.S. PATENT DOCUMENTS

| | | | |
|---|---|---|---|
| 3,700,487 | 10/1972 | Crandon et al. | 117/72 |
| 4,064,308 | 12/1977 | Laurin | 428/410 |
| 4,127,682 | 11/1978 | Laurin | 427/164 |
| 4,467,073 | 8/1984 | Creasy | 525/127 |
| 4,642,267 | 2/1987 | Creasy et al. | 428/413 |

Primary Examiner—James J. Seidleck
Assistant Examiner—W. R. H. Clark
Attorney, Agent, or Firm—Klauber & Jackson

[57] ABSTRACT

A polymer composition in the form of an alloy is disclosed, having hydrophilic and anti-fogging properties. The polymer alloy can be used as a coating, as an unsupported film or as a substrate having the desired anti-fogging properties.

The composition can be used where hydrophilic properties are desired. Surfaces coated with the composition described herein are more readily wetted by water or aqueous fluids, and may have a coefficient of friction of 0.10 or less when in contact with water.

The preferred composition contains a water-soluble polyvinyl alcohol and a water-soluble polyvinyl pyrollidone polymer in a weight ratio of about 4:1 to about 1:10.

A crosslinking agent comprised of a melamine, a mineral acid or a strong organic acid is included.

The composition is preferably applied to a substrate, such as a lens, and cured to form the coating.

13 Claims, No Drawings

HYDROPHILIC COMPOSITIONS WHICH ARE FOG-RESISTANT

The invention described herein relates to the field of polymeric compositions which have hydrophilic and anti-fogging properties upon drying or curing. Such compositions can be used to impart these properties to otherwise hydrophobic surfaces in the form of coatings or can be fabricated into unsupported films.

Surfaces coated with the composition are more readily wetted by water and aqueous fluids. Without limiting the invention to a specific mechanism, this may be a result of alterations in surface energy. Under certain conditions, the coatings can be so hydrophilic that they will imbibe large amounts of water and exhibit a reduced coefficient of friction when wet.

Uses for the compositions described herein include anti-fog coatings for substrates, such as windshields, lenses, windows and mirrors, and hydrophilic or water absorbing coatings for textile fibers, certain medical devices and other substrates.

Unsupported films, foams and molded parts may be produced from the polymeric composition described herein. Representative examples of unsupported films which can be used include contact lenses and burn dressings.

BACKGROUND OF THE INVENTION

Hydrophilic coatings and films have been described in several U.S. patents and their foreign counterparts. U.S. Pat. No. 4,467,073 describes the reaction of polyisocyanates in the presence of poly N-vinyl lactams and poly N,N-dimethylacrylamide. The stability of these compositions is limited due to the presence of highly reactive isocyanate groups. Such compounds are handled as two part systems, wherein each component is contained in an aprotic organic solvent. The components are combined whereupon crosslinking is effected, in essence, spontaneously. These systems are replete with environmental and toxicity concerns due to the presence of isocyanates and the exhausting of volatile organic solvents to the atmosphere. Environmental conditions when such polyisocyanates/poly-N-vinyl lactams or poly-N,N-dimethylacrylamide are used must be carefully controlled to reduce humidity, eliminate fire hazards and collect or incinerate any toxic vapors. Another anti-fog polymeric composition contains a preformed polyurethane in conjunction with a poly N-vinyl lactam. An example of this is disclosed in U.S. Pat. No. 4,642,267 (Creasy, et. al.). issued on Feb. 10, 1987.

Hydrophilic compositions have also been prepared, containing polyvinylpyrrolidone (PVP) with polyurethanes and polyvinylbutyrals. These compositions may be applied from stable solutions that contain alcohol or water. Unfortunately these compositions are relatively non-permanent, reacting with or dissolving in solvents or otherwise becoming softened, such as in the presence of heat. Thus, the hydrophilic properties of the composition may be compromised. Also, if external crosslinking agents are added, these may reduce the hydrophilic properties of the composition or introduce instability.

Anti-fog coatings consisting of polyvinyl alcohol which has been crosslinked with a combination of zirconium nitrate and formaldehyde are disclosed in U.S. Pat. Nos. 4,064,308 and 4,127,682. U.S. Pat. No. 3,700,487 discloses polyvinyl alcohol antifogs crosslinked with an acid and an organotitanate.

One object of the present invention is therefore to facilitate the use of water soluble ingredients in anti-fog coatings.

Another object of the present invention is to obviate the need for organic solvents, and thus avoid the toxic effects which accompany these compounds.

Another object of the present invention is to provide an anti-fog composition that can be used in the form of a film in combination with an adhesive backing to impart the anti-fog properties to various optical products.

Another object of the present invention is to provide an anti-fog composition which can be coated onto a substrate in solution form, dried and cured to render the substrate essentially fog resistant or "non-fogging".

Another object of the present invention is to provide an anti-fogging composition which maintains its anti-fogging properties in humid surroundings even after condensation forms.

Another object of the present invention is to provide a coating composition which is scratch-resistant.

Another object of the present invention is to provide a composition which is hydrophillic and which can be used to reduce water droplet formation on the coated substrate.

Another object of the present invention is to provide water-insoluble coatings with reduced friction properties when wet.

These and other objects will be apparent to those of ordinary skill from the teachings herein.

SUMMARY OF THE INVENTION

A polymer composition is disclosed which when cured exhibits superior anti-fogging properties. The composition is comprised of a water-soluble polyvinyl alcohol polymer and a poly-N-vinylpyrollidone polymer.

The polyvinyl alcohol polymer has a weight average molecular weight in the range of about 20,000 to about 200,000 and the polyvinylpyrollidone polymer has a weight average molecular weight of about 30,000 to about 400,000.

The weight ratio of the polyvinyl alcohol to the polyvinylpyrollidone (PVA:PVP) in the composition is in the range of about 4:1 to about 1:10.

A crosslinking agent is included which is comprised of a melamine crosslinking compound, a mineral acid, such as hydrochloric or phosphoric acid or a strong organic acid, such as p-toluene sulfonic acid. The crosslinking agent is present in an amount up to about 50% (w/w) based upon the weight of the nonvolatile components contained in the composition.

A method of coating a substrate to render it substantially non-fogging or hydrophillic, and a substrate coated with the polymer composition noted above is also included.

DETAILED DESCRIPTION OF THE INVENTION

Polyvinyl alcohols, as the term is used herein, refers to polymeric compounds having a high number of free, unreacted hydroxyl groups with the general structure:

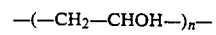

wherein n is an integer in the range of about 500 to about 5000.

Polyvinylpyrollidones, as used herein, refers to a group of N-vinyl lactams of the general structure:

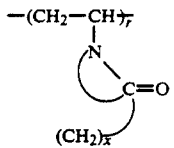

wherein r is an integer in the range of about 250 to about 4000 and x is 3 or 4.

The composition described herein may be in the physical form of an alloy of polyvinyl alcohol and poly-N-vinyl pyrollidone which upon crosslinking, forms a composition which can be dried and cured to create films which are clear, strong and chemically resistant to solvent attack. Crosslinking may be undertaken with a suitable crosslinking agent, e.g., with a melamine resin, a strong organic acid or a mineral acid.

The polymer and other ingredients used in the present composition are essentially water soluble prior to crosslinking. By combining these ingredients in the form of an aqueous solution, the use of volatile and nonvolatile organic solvents can be substantially avoided.

Polymer modifiers can optionally be included to modify the properties of the composition. Representative examples of the modifiers include chain extenders, plasticizers, builders, film forming agents, thickeners, wetting agents, adhesion promoters, levelling agents, foam control agents and the like.

Upon inclusion of these modifying agents, the composition can be reacted with the crosslinking agents to create a composition which is essentially water insoluble upon crosslinking.

Without limiting the invention, crosslinking of one of the components may render both of the polymers contained in this alloy essentially water-insoluble. For example, crosslinking agents which react with free hydroxyl groups of the PVA component may also render the PVP component essentially water insoluble as well. This may be due to the association between the PVA and PVP components or due to some other factor. One of the polymers may thus become essentially water-insoluble, and the second polymer may behave likewise due to its association with the first. Hence, both polymers are essentially insoluble in water due to the association between the two after crosslinking has occurred.

When the crosslinking agent is a melamine resin, the agent may react with the alcohol hydroxyl groups to a large extent, leaving the PVP amide functions largely unreacted. However, even without the crosslinking reaction involving these amide functions, the non-crosslinked component remains bound in the composition as described above.

The crosslinking agent is typically added to the composition in an amount up to about 50% by weight, based upon the weight of the nonvolatile components contained in the overall composition. For purposes of quantifying the crosslinking agent, the nonvolatile components include the two polymers, any monomers added and any other nonvolatile modifiers which are included, e.g., surfactants, plasticizers and the like.

Upon curing, the composition forms a non-fogging material, and when used as a coating the composition adheres to the substrate and renders it "fog-resistant" or "anti-fogging".

While most other anti-fogging compositions rely on hydrophobic materials to provide water insolubility, the invention described herein utilizes all hydrophilic materials. The crosslinking of one water soluble polymer as a means of insolubilizing another water soluble polymer is considered highly unique. The hydrophilic character of such compositions is therefore not compromised or restrained.

The ratio of polymers (PVA:PVP) ranges from about 4:1 to about 1:10 on a (w/w) basis. The preferred polymer blend ratio of PVA:PVP ranges from about 1:1 to about 1:8.

The polyvinyl alcohols used to make the anti-fogging composition typically have a weight average molecular weight of about 20,000 to about 200,000 or higher.

The most preferred polyvinyl alcohols have a weight average molecular weight of about 40,000 to about 150,000.

The polyvinyl alcohols may also have up to about 25% non-hydrolyzed polyvinyl acetate groups present therein. In fact, most commercial polyvinyl alcohol resins are actually copolymers of vinyl alcohol and vinyl acetate. The most preferred polyvinyl alcohols are at least about 84-95% hydrolyzed, i.e., at least about 84-95% of the hydroxyl groups are available for association with other ingredients, crosslinking and the like.

Other water soluble copolymers of vinyl alcohol useful herein include vinyl alcohol/vinyl acetal and vinyl alcohol/vinyl acetate/vinyl acetal terpolymers.

The polyvinyl pyrollidones preferably used in the invention typically have a weight average molecular weight of about 30,000 to about 400,000 or higher. The preferred molecular weight range, however, is widely variable, and to a large extent is dependent upon the end use of the composition.

The PVP component may alternatively be comprised in whole or in part of copolymers. Representative examples of copolymers which may be included are vinylpyrollidone/vinyl acetate and the hydrolysis products thereof, vinylpyrollidone/vinylcaprolactam and vinylpyrollidone/N,N-dimethylacrylamide. These may be added to the blend in combination with PVP as desired, or may be used to replace some or all of the PVP in the blend.

Optional chain extenders or crosslink density modifiers may also be included. Examples of such additives are polyhydric alcohols such as ethylene glycol, butanediol, polyethylene glycol and polyethylene glycol copolymerized with polypropylene glycol.

The preferred crosslinking agents used in the present invention include melamine resins, mineral acids and strong organic acids. However, alternative crosslinking agents may also be used.

The preferred melamines are hexamethoxymethyl melamine resins and methylated urea-formaldehyde resins. The preferred strong organic acids for use herein include p-toluene sulfonic acid, xylene sulfonic acid and methane sulfonic acid and their ammonium or amine salts.

The composition described herein can be prepared by incorporating the polymers into an aqueous solution. Any optional components, such as any monomers, additives, plasticizers, etc. can likewise be added, most preferably in the form of aqueous solutions. These solutions can be mixed, after which the crosslinking agent(s) are added.

If necessary or desired, minor amounts of water miscible organic solvents may also be included to speed drying or to improve adhesion to certain substrates, e.g., plastic or rubber, if appropriate.

Alternatively, an organic solvent, such as a low molecular weight alcohol or another polar organic compound may be used, as long as the solubility of the ingredients is maintained. The most preferred solvent used herein is water.

Upon incorporation of the components noted above, the overall solids content of the composition prior to application to a substrate is typically in the range of about 5% to about 50% (w/v).

The composition described may also be combined with other active molecules, such as surfactants, disinfectants, antibiotics, pigments and organic dyes. Some such additional ingredients tend to associate with hydrophilic polymers, and can therefore be retained in the coating for prolonged periods of time. Representative examples include anionic and cationic surfactants and nonionic surfactants containing polyethylene chains with a molecular weight greater than about 250.

Sodium dioctylsulfosuccinate and related sulfosuccinates, together with various fatty acid derived ethosulfates, are particularly preferred since these components are capable of improving surface wetting and/or anti-fogging properties. Compositions containing such sulfonates tend to maintain these properties over extended periods of time.

It may also be preferable to include additives with reactive groups which can be chemically integrated into the polymer alloy during the crosslinking reaction. For example, the surfactants, nonoxanol-9 and polyoxyethylene-propylene block copolymers are useful in this regard; each imparts enhanced long term wetting and/or anti-fog performance to the composition when included.

The crosslink density may affect the nature of the alloy in the overall composition. Crosslink density can be varied by altering the concentration of crosslinking agent, adjusting the acidity of the reaction mixture, increasing the temperature or otherwise modifying the reaction parameters. Hence, coatings can be formed which are hard and relatively resistant to scratching, or relatively soft with increased hydrophilic character. The latter compositions may associate with many times their weight in water while retaining reasonable mechanical integrity. These compositions possess significantly reduced coefficients of friction when wet, and are thus useful for the production of contact lenses, catheters, wound dressings and the like.

As will be appreciated by those skilled in the art, the melamine and related agents noted above may function differently than the acid crosslinking compounds. While the melamine crosslinking agents form crosslinks, the mineral and organic acids may react with the polymeric backbone(s) of the molecule to essentially induce self-crosslinking, such as between crosslinkable hydroxyl groups of the polyvinyl alcohol polymers. Thus, a crosslinking agent can be selected which contributes its own physical properties to the alloy, or a compound can be added to induce crosslinking, after which it is removed or is otherwise non-reactive.

After the ingredients noted above are combined, the composition may be coated onto the appropriate substrate in the desired coating thickness using a roller coat, dip, spray or another method, whichever is most compatible with the particular substrate. Likewise, self-supporting films can be spray or dip coated, or curtain coated onto a backing sheet, and anti-fogging articles may be formed, e.g., cut or molded, in the desired shape.

The substrate is preferably a clear glass or plastic including but not limited to a polyester, polycarbonate, acrylics, polyurethane, cellulosic or epoxy type substrate.

Curing the coated composition or a substrate comprised of the composition typically requires exposure to a temperature of at least about 75° C. for a time period ranging from less than one minute to as long as about one hour or more, depending upon the type and amount of crosslink agent included, the cure temperature selected, the crosslinking density desired and the reactivity of the PVA or PVP present in the formulation, the thickness of the composition and other parameters.

The invention can be illustrated in connection with the following examples. However, the scope of the claims is not to be limited thereby.

EXAMPLE 1

A solution is prepared with 10g PVA (Airvol 523, Air Products and Chemicals Co.), 5g PVP (K90, GAF Corp.) 2g p-toluene sulfonic acid solution neutralized with ammonium hydroxide and 125g water.

When this composition is applied to a clear polycarbonate substrate and cured for 15 min. at 130° C., a hard, clear coating results which is not affected by rubbing with water, alcohol or methyl ethyl ketone (MEK). The anti-fogging properties of the coated substrate remain good even after soaking in water for several days.

To evaluate anti-fogging properties, a coated substrate is placed over a container of water heated to 50° C. The clarity of the substrate is then evaluated. The time at which visible condensation commences may also be measured.

EXAMPLE 2

A solution is prepared with 10g PVA (Airvol 523, Air Products and Chemicals Co.), 20g PVP (Luviskol 90; BASF Corporation), 20g N-methylpyrollidone, 0.6g melamine resin (Cymel 202) and 200g water. To this is added 1 g p-toluene sulfonic acid dissolved in 10g water and neutralized with ammonium hydroxide.

When the composition is applied to a clear polycarbonate substrate and cured for 15 min. at 135° C., a hard clear coating results which is not affected by rubbing with water, alcohol or MEK. The anti-fog properties are superior to the coating prepared in Example 1, and remain very good even after soaking in water for several days.

EXAMPLE 3

To the composition of Example 2 is added 2g sodium dioctylsulfosuccinate. Flow and leveling properties are improved and the anti-fog properties are excellent.

EXAMPLE 4

A solution is prepared with 10g PVA (Airvol 205), 20g PVP/VA copolymer (E735, GAF Corp.), 1 g melamine resin (Cymel 303), 5g N-methylpyrollidone, 2g ammonium xylene sulfonate, 1 g sodium dioctylsulfosuccinate and 200g water.

A coating from the above solution, after curing for 15 minutes at 135 degrees C., is similar to that prepared in Example 3.

EXAMPLE 5

A solution is prepared with 10g PVA (Airvol 205), 5g PVP (K60, GAF Corp.), 5g N-methylpyrollidone, 2g ammonium xylene sulfonate, 20g isopropyl alcohol and 100g water.

When this solution is applied to a polyester film and cured for one minute at 150° C., a hard, clear coating results that becomes very slippery when wet (coefficient of friction 0.05 versus 0.22 for the uncoated polyester film). The coating does not dissolve with extended soaking in water, and it remains slippery after drying and re-wetting.

EXAMPLE 6

A solution is prepared as in Example 5 without adding the PVP. This material can be dried and cured to a hard, water-resistant coating. The coating is not very hydrophilic and the anti-fog properties are poor.

While the preferred embodiments of the invention have been described herein in detail, numerous alternative embodiments are contemplated as falling within the scope of the invention. Consequently, the claims are not to be limited thereby.

What is claimed is:

1. A polymer composition which when cured exhibits anti-fogging properties consisting essentially of:
   (a) a water-soluble polyvinyl alcohol polymer and a water-soluble polyvinyl pyrollidone polymer, the polyvinyl alcohol polymer having a weight average molecular weight of about 20,000 to about 200,000 and the polyvinyl pyrollidone polymer having a weight average molecular weight of about 30,000 to about 400,000, and (b) a crosslinking agent comprised of a melamine, a mineral acid or a strong organic acid, said crosslinking agent being present in an amount up to about 50% by weight based upon the weight of the non-volatile components contained in the composition.

2. A polymer composition according to claim 1 wherein the water-soluble polyvinyl alcohol polymer and the water-soluble polyvinyl pyrollidone polymer form an alloy.

3. A polymer composition according to claim 1 wherein the weight ratio of the polyvinyl alcohol polymer to the polyvinyl pyrollidone polymer being in the range of from about 4:1 to about 1:10.

4. A polymer composition in accordance with claim 1 further comprised of a chain extender, crosslink density modifier or surfactant.

5. A polymer composition in accordance with claim 1 wherein the water-soluble polyvinyl pyrollidone polymer is a copolymer selected from the group consisting of vinylpyrollidone/vinyl acetate, vinylpyrollidone/vinylcaprolactam and vinylpyrollidone/N,N-dimethylacrylamide.

6. A polymer composition in accordance with claim 1 wherein the polyvinyl alcohol is a water soluble copolymer selected from the group consisting of vinyl alcohol/vinyl acetate, vinyl alcohol/vinyl acetate/vinyl acetal and vinyl alcohol/vinylpyrollidone.

7. A polymeric composition according to any one of the claims 1-6 in cured form.

8. A method of treating a substrate to render it substantially fog-resistant comprising applying to the substrate a composition which consists essentially of (a) a water-soluble polyvinyl alcohol polymer and a water soluble polyvinyl pyrollidone polymer,
   the polyvinyl alcohol polymer having a weight average molecular weight of about 20,000 to about 200,000 and the polyvinyl pyrollidone polymer having a weight average molecular weight of about 30,000 to about 400,000, and
   (b) a crosslinking agent selected from the group consisting of a melamine, a mineral acid and a strong organic acid,
   said crosslinking agent being present in an amount up to about 50% by weight based on the weight of the non-volatile components contained in the composition.

9. A method in accordance with claim 8 wherein the polyvinyl pyrollidone compound is selected from the group consisting of vinylpyrollidone/vinyl acetate, vinylpyrollidone/vinylcaprolactam, vinylpyrollidone/N,N-dimethylacrylamide and vinyl acetate/vinyl alcohol/vinyl acetal terpolymers.

10. A substrate coated with a polymer composition in accordance with claim 1.

11. A polymer composition according to claim 1 which has a coefficient of friction of 0.10 or less when wetted with water or an aqueous fluid.

12. An article coated with a polymer composition according to claim 1 having a coefficient of friction of 0.10 or less when wetted with water or an aqueous fluid.

13. An article according to claim 12 wherein the polymer composition is in cured form.

* * * * *